United States Patent Office 3,772,362
Patented Nov. 13, 1973

3,772,362
ANTHRAQUINONE COMPOUNDS
Max A. Weaver, David J. Wallace, and James M. Straley, Kingsport, Tenn., assignors to Eastman Kodak Company, Rochester, N.Y.
No Drawing. Continuation of abandoned application Ser. No. 560,093, June 24, 1966. This application Apr. 19, 1972, Ser. No. 245,399
Int. Cl. C09b 1/32, 1/50
U.S. Cl. 260—377      4 Claims

ABSTRACT OF THE DISCLOSURE

Compounds having the general formula

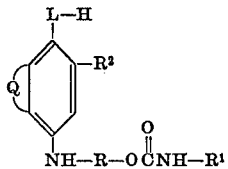

in which —L—H is an amino group, $R^2$ is hydrogen, alkyl, alkoxy, cyano or halogen, R is an organic bridging group, $R^1$ is alkyl, cyclohexyl, aralkyl, or aryl, and Q is a phthaloyl residue. The disclosed compounds produce blue shades on synthetic fibers and exhibit excellent fastness properties.

---

This application is a continuation of our application Ser. No. 560,093, filed June 24, 1966, now abandoned, for "Anthraquinone Dyes for Hydrophobic Fibers."

This invention relates to new compounds useful as dyes. More particularly this invention relates to new anthraquinone compounds especially useful as dyes for textile fibers, yarns and fabrics.

In the dyeing and printing of textile materials such as fibers, filaments, woven and nonwoven textiles and similar articles, polyamides, polyesters, acrylics and the like, it is of prime importance that the dyes have high color strength and good fastness, e.g. of bleaching, rubbing, drycleaning, heat, atmospheric fumes, perspiration and washing. The dyes should, especially, have good fastness to light.

The anthraquinone compounds of the invention possess such properties and have the following general formula (I) 

wherein Z represents an anthraquinonyl radical containing at least one amino or hydroxyl group in an ortho- or para-relationship with respect to the point of attachment of X. This anthraquinonyl radical can be further substituted with one or more groups such as, for example, nitro; halogen, e.g. Cl, Br, I; hydroxyl; acylamido, e.g. acetamido, propionamido, benzamido; alkyl, e.g. methyl, ethyl, propyl; alkoxy, e.g. methoxy, ethoxy; unsubstituted and substituted amino, e.g. methylamino; alkyl, sulfonamido, e.g. methanesulfonamido; alkylsulfonyl, e.g. methanesulfonyl; nitrile; etc. Preferably, the alkyl groups specified above are lower alkyl of from one to about four carbon atoms.

X represents a bivalent radical selected from the group consisting of —NH—, O, and S; R represents (a) an alklylene group, preferably lower alkylene groups, e.g. a straight or branched chain of from 1 to 4 carbon atoms, and cycloalkylene groups (b) a monocyclic carbocyclic aromatic group of the benzene series including phenylene and substituted phenylene such as phenylene, lower alkylphenylene, e.g. o,m-tolylene, lower alkoxyphenylene, e.g. o,m-methoxyphenylene, halophenylene, e.g. o,m-chlorophenylene, alkylsulfonamidophenylene, e.g. o,m-methylsulfonamidophenylene, dicarboxylicacidimidophenylene, e.g. o,m-succinimidophenylene, acylamidophenylene, e.g. o,m-acetamidophenylene, benzamidophenylene, thiocyanophenylene, e.g. o,m-thiocyanophenylene, alkylthiophenylene, e.g. o,m-methylthiophenylene, aryloxyphenylene, e.g. o,m-benzyloxyphenylene, arylaminophenylene, e.g. o,m-phenylaminophenylene, benzylaminophenylene, e.g. o,m-benzylaminophenylene, N-alkylarylaminophenylene, e.g. o,m-N-phenylmethylaminophenylene, carbalkoxyphenylene, e.g. o,m-carbethoxyphenylene, benzoylphenylene, e.g. o,m-benzoylphenylene (c) a linear bivalent combination of (a)+(a) or (b)+(a) for example, attached directly to each other, e.g. as in a benzyl group or attached via an ethereal group, e.g. as in a

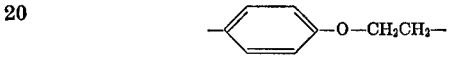

group; and $R_1$ represents an alkyl radical, preferably lower alkyl, i.e. from one to four carbon atoms, including unsubstituted alkyl and substituted alkyl such as hydroxyalkyl, e.g. hydroxyethyl, polyhydroxyalkyl, e.g. beta, gamma-dihydroxypropyl; alkoxyalkyl, e.g. methoxyethyl, cyanoalkyl, e.g. cyanoethyl, cyanoalkoxyalkyl, e.g. β-cyanoethoxyethyl, acyloxyalkyl, e.g. acetoxyethyl, carboalkoxyalkyl, e.g. carboethoxyethyl, halogenoalkyl, e.g. chloroethyl, hydroxyhalogenoalkyl, e.g. β-hydroxy-gamma-chloropropyl, alkylsulfonylalkyl, e.g. methylsulfonylethyl, alkyl-OCOOCH$_2$CH$_2$—, e.g.

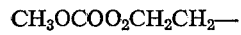

carboxyamidoalkyl, e.g. carboxamidoethyl; benzyl; phenoxyalkyl, e.g. β-phenoxyethyl; cyanoalkyl, e.g. β-cyanoethyl; alkylsulfonamidoalkyl, e.g. methylsulfonamidoethyl; alkylcarboamidoalkyl, e.g. ethylcarboamidoethyl; dicarboximidoalkyl, e.g. β-dicarboximidoethyl; cycloalkyl, e.g. cyclopentyl, cyclohexyl, etc.; a monocyclic carbocyclic aromatic group of the benzene series, e.g. the monovalent analog of the aromatic groups as are represented by R above; and aralkyl groups, e.g. benzyl, and substituted derivatives thereof. The other substituents attached to the ring nucleus of Z or to R or $R_1$ are not critical and serve primarily as auxochromes to control the color of the anthraquinone compound.

A preferred embodiment of this invention are the compounds of general Formula II (II) 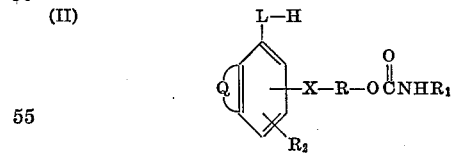

wherein X, R, and $R_1$ are as defined above except that X is attached in the 2 or 4 position of the aromatic ring and when X represents NH, R must represent a monocyclic, carbocyclic, aromatic group of the benzene series as specified for the (b) alternative for R above, or a arylenealkylene type group, i.e. a linear combination of one or more groups taken from alternatives (a) and (b) as mentioned in alternative (c) mentioned above for the group R; L represents an —NH—, —NCH$_3$—, —$NC_2H_5$—, or an —O—; radical Q represents the atoms necessary to complete a 9,10-anthraquinonyl nucleus optionally having additional substituents listed above for Z in the 5, 6, 7 and 8 positions of the anthraquinonyl nucleus; and $R_2$ represents a member selected from the group consisting of hydrogen, halogen, alkyl, alkoxy, hydroxy, nitrile, nitro amino, amido, acyl and sulfonyl radicals attached to the aromatic ring in meta relationship with respect to the point of attachment of the

—X—R—OOCNHR$_1$ group, the meta orientation being especially significant where $R_2$ is an inductively and resonantly electron withdrawing group.

The anthraquinone compounds of this invention can be prepared by first preparing an anthraquinone which contains both a hydroxy or amino group, and an omega-hydroxy-alkoxy-aryloxy- or -aralkoxy- etc. group attached to the same benzenoid ring. The anthraquinone compound is then reacted with an isocyanate having the general formula $R_1NCO$, wherein $R_1$ is as defined above.

Other methods can be utilized for preparing some of the more complex anthraquinone compounds of this invention. For example, when X represents an —NH— radical, the following general method may be utilized:

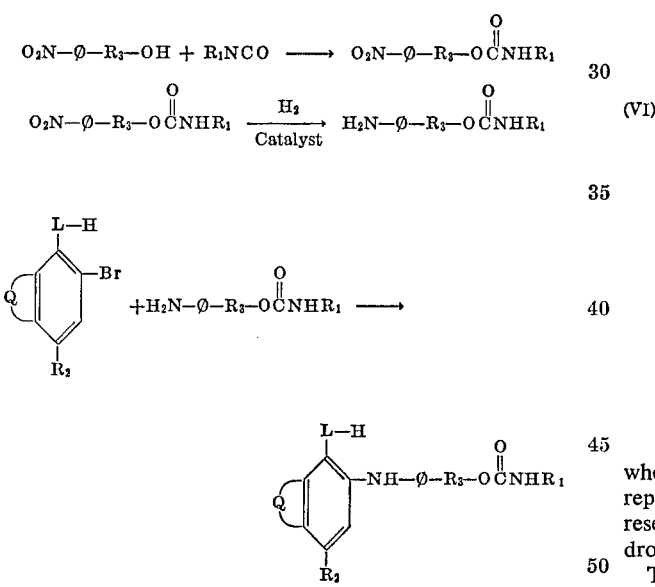

wherein $R_1$, $R_2$, L and Q are as defined above, and ∅ represents a bivalent monocyclic carbocyclic aromatic group of the benzene series, e.g. a phenylene group, and $R_3$ represents a lower alkylene group, e.g. a lower alkylene group, i.e. a straight or branched chain of from one to four carbon atoms; an alkyleneoxy group, e.g.

—O—CH$_2$—

—CH$_2$OCH$_2$—, —OCH$_2$CH$_2$—, etc.

Especially useful compounds of this invention formed by the above reaction schemes fall into the following general formulas:

(III) 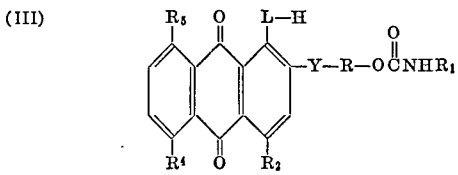

(IV) 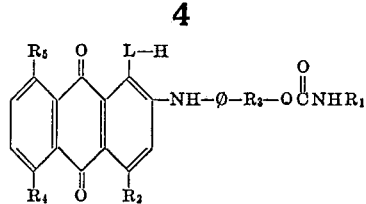

(V) 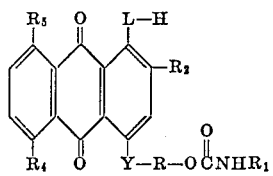

(VI) 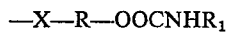 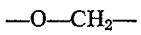 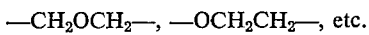

wherein R, $R_1$, $R_2$, $R_3$, L, and ∅, are as defined above, Y represents a —O— or —S— radical and $R_4$ and $R_5$ represent members of the group consisting of hydrogen, hydroxyl, amino and nitro groups.

The distinctive structure of the compounds of this invention imparts unexpected properties to the present compounds, especially when the compounds are used for dyeing textiles, including improved fastness to light and improved affinity for polyester fibers. Thus, the anthraquinone compounds of the invention have been found to possess properties superior to similar but distinct compounds when tested by methods such as described in the A.A.T.C.C. Technical Manual, 1964 edition, depending in part upon the particular dye used and the fiber being dyed.

The resultant anthraquinone compounds can be used for dyeing textile materials including synthetic polymer fibers, yarns and fabrics giving a variety of fast shades including blue, red and brown when applied thereto by conventional dyeing methods. The compounds have moderate affinity for cellulose ester and polyamide fibers and possess the valuable property of staining wool less than do previous anthraquinone dyes. When the anthraquinone compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative anthraquinone compounds of our invention.

EXAMPLE 1

A mixture of 1.5 g. (0.5 mole) 1-amino-2-($\beta$-hydroxyethoxy)-4-hydroxyanthraquinone, 0.6 g. (0.5 mole) phenylisocyanate, 2 drops tributylamine, and 50 ml. dry chlorobenzene was stirred and refluxed 1 hr. The reaction mixture was then cooled to room temperature and filtered. The precipitate was then washed with benzene and dried. The yield was 1.8 g. of a dark red solid, M.P. 220–223° C. The product dyes polyester fibers a desirable pink shade with excellent light fastness and unusual resistance to sublimation. The product is much superior to the comparable unsubstituted material. The dye has the following structural formula:

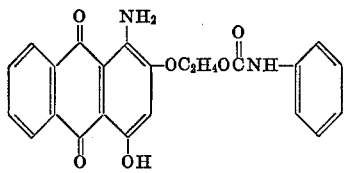

EXAMPLE 2

A mixture of 1.8 g. (0.5 mole) of 1,4-dihydroxy-2-(m-hydroxymethylanilino)-anthraquinone, 0.6 g. (0.5 mole) phenylisocyanate, 2 drops of tributylamine and 50 ml. of dry chlorobenzene was stirred and refluxed for about one hour. The reaction mixture was then cooled to room temperature and filtered. The precipitate was washed with benzene and dried. The product dyes polyester fibers a blue-red with outstanding fastness to sublimation. The dye has the following structural formula:

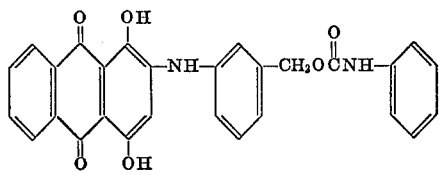

EXAMPLE 3

(a) A mixture of 18.3 g. p-nitrophenoxyethanol, 11.9 g. phenylisocyanate, and 100 ml. dry chlorobenzene were stirred and refluxed 1 hour. On cooling, the urethane of the following structure precipitated:

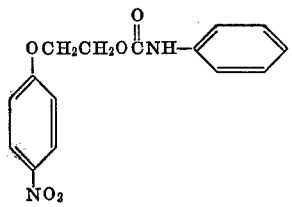

(b) The product from (a) above was hydrogenated over Raney nickel in ethanol at 1500 p.s.i., and 75° C. The corresponding primary amine was obtained in good yield.

(c) A mixture of 2.1 g. quinizarin, 1.3 g. leucoquinizarin, 5 g. product from (b) above, 0.8 g. boric acid, and 40 ml. isopropanol was stirred and refluxed 20 hours. The mixture was cooled and 20 ml. water added. After 5 hours the dye was collected by filtration and washed with a little water. The cake was reslurried in 300 cc. 7% aqueous NaOH and stirred at room temperature for 24 hours. The dye was filtered off, washed well with water, and dried. The product dyes polyester fibers a reddish-blue shade of outstanding fastness to sublimation. The product has the following structural formula:

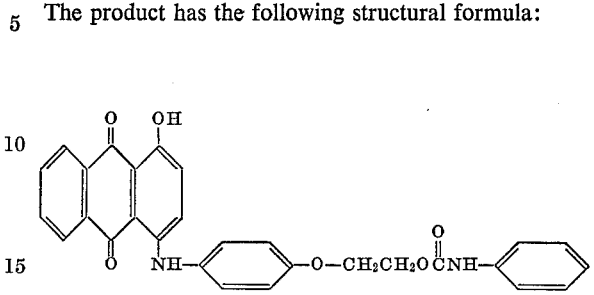

EXAMPLE 4

To a solution prepared from 0.50 g. KOH, 30 cc. methyl Cellosolve, and 0.78 g. 2-hydroxy-ethanethiol is added 3.16 g. 2-bromoquinizarin. The mix is stirred at reflux for 8 hours, cooled, and the product obtained by drowning in water, filtering, washing with water, and drying. The product was reacted with phenylisocyanate according to the method outlined in reaction 1. The resultant dye has the formula:

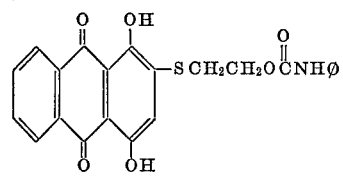

EXAMPLE 5

A mixture of 3 g. of 1-amino-2-cyano-4-(m-hydroxymethyl)anilinoanthraquinone, 1,2 g. phenyl isocyanate, 2 drops triethylamine, and 50 ml. dry chlorobenzene was stirred and refluxed 1 hour, chilled, filtered, washed with methanol, and dried. The product dyes polyester fibers a blue-green shade of outstanding fastness properties and has the following probable structural formula:

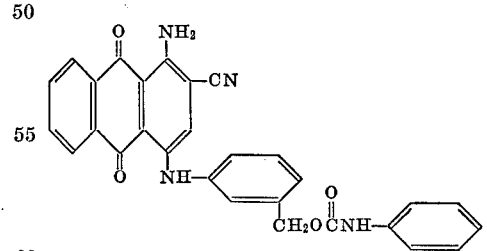

The dyes in the following table are made by one of the preceding methods. The substituents indicated are with reference to Formula VII below.

(VII)

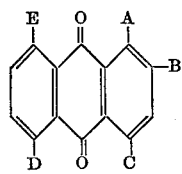

| Example | A | B | C | D | E | Color |
|---|---|---|---|---|---|---|
| 6 | —OH | —NHC₂H₄OOCNHC₆H₅ | —OH | —H | —H | Pink. |
| 7 | —OH | —H | —NH—⌬—C₂H₄OOCNHC₆H₅ | —NO₂ | —OH | Blue. |
| 8 | —OH | —NHC(CH₃)₂CH₂OOCNHC₆H₅ | —OH | —H | —H | Pink. |
| 9 | —NH₂ | —OCH₂C(CH₃)₂CH₂OOCNHC₆H₅ | —OH | —H | —H | Do. |
| 10 | —NH₂ | —OCH₂CH₂OOCNHC₄H₉ | —OH | —H | —H | Do. |
| 11 | —NH₂ | —OC₂H₄OOCNHCH₂CO₂C₂H₅ | —OH | —H | —H | Do. |
| 12 | —NHCH₃ | —H | —NHC₂H₄OOCNHC₆H₅ | —H | —H | Blue. |
| 13 | —NH₂ | —⌬—OOCNHC₆H₅ | —OH | —H | —H | Pink. |
| 14 | —NH₂ | —OC₂H₄OOCNHC₆H₅ | —NHSO₂CH₃ | —H | —H | Red. |
| 15 | —NH₂ | —OCH₂—⌬S⌬—CH₂OOCNHC₆H₅ | —OH | —H | —H | Pink. |
| 16 | —OH | —CH₂C₆H₅ | —NH—⌬—C₂H₄OOCNHC₆H₅ | —H | —H | Violet. |
| 17 | —NH₂ | —OC₂H₄OOCNH—⌬—Cl | —OH | —H | —H | Pink. |
| 18 | —NH₂ | —OC₂H₄OOCNH—⌬—NO₂ | —OH | —H | —H | Do. |
| 19 | —NH₂ | —O(CH₂)₄OCNH—⌬ | —OH | —H | —H | Do. |
| 20 | —NHCH₂CH₂OOCNH—⌬ | —H | —NHCH₂CH₂OOCNH—⌬ | —H | —H | Blue. |
| 21 | —NH₂ | —OC₂H₄OC₂H₄OOCNH—⌬ | —OH | —OH | —H | Pink. |
| 22 | —NH₂ | —Br | —NH—⌬—OC₂H₄OOCNH—⌬ | —H | —H | Blue. |
| 23 | —NH₂ | —CON(CH₃)₂ | Same as above | —H | —H | Do. |
| 24 | —NH₂ | —CN | do | —H | —H | Do. |
| 25 | —NH₂ | —SCH₂CH₂OOCNHC₆H₅ | —OH | —H | —H | Red violet. |
| 26 | —NH₂ | —CH₃ | —NH—⌬—CH₂CH₂OOCNHC₆H₅ | —H | —H | Violet. |
| 27 | —OH | —H | —NH—⌬—C₂H₄OCNH—⌬ | —H | —H | Do. |
| 28 | —OH | —H | —NH—⌬—CH₂OCNH—⌬ | —H | —H | Do. |
| 29 | —OH | —NH—⌬—CH₂CH₂OCNH—⌬ | —OH | —H | —H | Bluish red. |

The anthraquinone compounds of the invention may be used for dyeing hydrophobic fibers such as linear polyester, cellulose ester acrylic, polyamide, etc., fibers in the manner described in U.S. Pats. 2,880,050, 2,782,187 and 2,043,827. The following examples illustrate methods by which the anthraquinone compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the anthraquinone compounds of the invention are water-insoluble, they can be applied from aqueous dispersions in the manner of the so-called "dispersed dyes." However, coloration can also be effected, for example, by incorporating the compounds into the spinning dope and spinning the fiber as usual. The anthraquinone compounds of our invention are not equivalents when used as dyes. The degree of dye affinity varies, for example, depending upon the materials being dyed and the formula of the anthraquinone compound. Thus, for example, all the compounds will not have the same degree of dye affinity for the same material.

By cellulose aliphatic carboxylic acid esters having 2 to 4 carbon atoms in the acid groups thereof, we mean to include, for example, both partially hydrolyzed and unhydroyzed cellulose acetate, cellulose propionate and cellulose acetatebutyrate.

Polymeric linear polyester materials of the terephthalate type are illustrative of the linear aromatic polyester textile materials that can be dyed with the new anthraquinone compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Pat. 2,901,446. Dacron and Terylene polyester fibers are described, for example, in U.S. Pat. 2,465,319. The polymeric linear polyester materials disclosed in U.S. Pats. 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the compounds.

The invention has been described in considerable detail with particular reference to certain preferred embodiments thereof, but it will be understood that variations and modifications can be effected within the spirit and scope of the invention as described hereinabove, and as defined in the appended claims.

We claim:
1. A compound having the formula

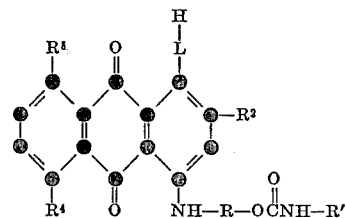

wherein
L is

R is lower alkylene; cyclohexylene; phenylene; phenylene substituted with lower alkyl, lower alkoxy, or halogen; cyclohexylene-di-methylene; phenylene-lower-alkylene; phenylene-lower-alkylene in which the phenylene ring is substituted with lower alkyl, lower alkoxy, or halogen; phenyleneoxy-lower-alkylene; phenyleneoxy-lower-alkylene in which the phenylene ring is substituted with lower alkyl, lower alkoxy, or halogen; or lower alkyleneoxy-lower-alkylene;

$R^1$ is lower alkyl, cyclohexyl, benzyl, phenyl, or phenyl substituted with lower alkyl, lower alkoxy, halogen, or nitro;

$R^2$ is hydrogen, lower alkyl, lower alkoxy, cyano or halogen; and $R^4$ and $R^5$ each is hydrogen, hydroxy, amino, nitro or halogen.

2. A compound according to claim 1 wherein R is lower alkylene; cyclohexylene; phenylene; phenylene substituted with lower alkyl, lower alkoxy, or halogen; cyclohexylene-di-methyene; phenylene-lower-alkylene; phenylene-lower-alkylene in which the phenylene ring is substituted with lower alkyl, lower alkoxy, or halogen; or lower alkyleneoxy-lower-alkylene.

3. An anthraquinone compound according to claim 1 wherein
R is lower alkylene, phenylene, phenylene-lower-alkylene or cyclohexylene-di-methylene; and
$R^4$ and $R^5$ each is hydrogen, hydroxy or amino.

4. A compound according to claim 1 having the formula

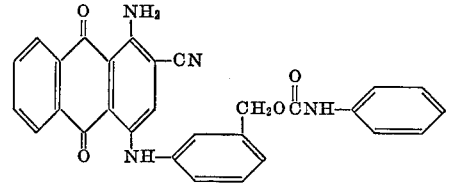

References Cited
UNITED STATES PATENTS
3,379,738  4/1968  Wallace et al. _____ 260—377

LORRAINE A. WEINBERGER, Primary Examiner

E. J. SKELLY, Assistant Examiner

U.S. Cl. X.R.
8—39, 40; 260—372

UNITED STATES PATENT OFFICE
CERTIFICATE OF CORRECTION

Patent No. 3,772,362                   Dated November 13, 1973

Inventor(s) Max A. Weaver, David J. Wallace, and James M. Straley

It is certified that error appears in the above-identified patent and that said Letters Patent are hereby corrected as shown below:

Column 1, line 41, delete "of" and insert therefor ---to---.

Column 1, line 57, delete "alkyl, sulfonamido," and insert therefor ---alkyl sulfonamido,---.

Column 5, line 74, delete "5 hours" and insert therefor --- .5 hour , ---.

Column 6, line 43, delete "1,2" and insert therefor ---1.2---.

Columns 7 and 8, in the Table, Example 10, under the heading "B", delete "-OCH$_2$CH$_2$OOCNHO$_4$H$_9$" and insert therefor ---

-OCH$_2$CH$_2$OOCNHC$_4$H$_9$ ---.

Column 9, line 3, delete "cellulose ester acrylic," and insert therefor ---cellulose ester, acrylic,---.

Column 10, lines 3-10, Claim 1, delete the formula therein and insert therefor ---

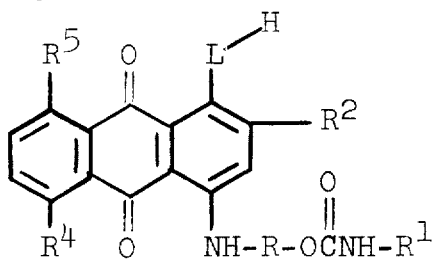

Signed and sealed this 17th day of September 1974.

(SEAL)
Attest:

McCOY M. GIBSON, JR.
Attesting Officer

C. MARSHALL DANN
Commissioner of Patents